US006412823B1

United States Patent
Ødegaard

(10) Patent No.: US 6,412,823 B1
(45) Date of Patent: Jul. 2, 2002

(54) ROTATING CONNECTOR WITH COMPENSATING UNIT

(75) Inventor: Jens Ødegaard, Nordstrøno (NO)

(73) Assignee: Den norske stats Oljeselskap a.s. (NO)

( * ) Notice: Subject to any disclaimer, the term of this patent is extended or adjusted under 35 U.S.C. 154(b) by 0 days.

(21) Appl. No.: 09/647,476

(22) PCT Filed: Mar. 25, 1999

(86) PCT No.: PCT/NO99/00101

§ 371 (c)(1),
(2), (4) Date: Jan. 9, 2001

(87) PCT Pub. No.: WO99/49177

PCT Pub. Date: Sep. 30, 1999

(30) Foreign Application Priority Data

Mar. 26, 1998 (NO) .......................................... 19981379

(51) Int. Cl.$^7$ ................................................ F16L 39/04
(52) U.S. Cl. ...................... 285/121.3; 285/900; 285/96; 285/106; 285/101; 285/121.6
(58) Field of Search ............................ 285/95, 96, 101, 285/106, 900, 121.1, 121.3, 121.4, 121.5, 121.6

(56) References Cited

U.S. PATENT DOCUMENTS

| | | | | |
|---|---|---|---|---|
| 2,957,709 A | * | 10/1960 | Skarstrom .................... 277/431 |
| 4,111,467 A | * | 9/1978 | de Fremery ............. 285/121.3 |
| 4,405,162 A | * | 9/1983 | Williams ................. 285/121.6 |
| 4,602,806 A | * | 7/1986 | Saliger ....................... 277/572 |
| 4,647,076 A | | 3/1987 | Pollack et al. |
| 4,647,077 A | | 3/1987 | Ethridge et al. |
| 4,662,657 A | * | 5/1987 | Harvey et al. ............... 277/352 |
| 4,669,758 A | | 6/1987 | Feller et al. |
| 4,819,966 A | | 4/1989 | Gibb |
| 4,828,292 A | * | 5/1989 | Jansen ...................... 285/121.6 |
| 5,788,288 A | * | 8/1998 | Jostein ........................ 285/106 |
| 5,895,077 A | * | 4/1999 | Sigmundstad ............ 285/121.5 |
| 6,234,540 B1 | * | 5/2001 | Drijver et al. .............. 277/558 |
| 2002/0000251 A1 | * | 1/2002 | Suzuki et al. ............ 285/121.3 |

FOREIGN PATENT DOCUMENTS

GB 2306587 * 5/1997 .................. 285/96

* cited by examiner

*Primary Examiner*—Eric K. Nicholson
(74) *Attorney, Agent, or Firm*—Harness, Dickey & Pierce, P.L.C.

(57) ABSTRACT

A rotating connector for the transfer of at least one pressurized process fluid, and comprising a central stem (2) on which there is placed a number of ring elements (3, 4) comprising at least one annulus element (3) for fluid transfer between an associated course (8) in the stem (2) and an outlet (9) from the connector, and a bearing ring element (4) arranged on each side of the annulus element (3) and sealed there-against by dynamic seals (14) operated by means of a barrier liquid having a higher pressure than the process fluid pressure, and a looking nut (21) to keep the ring elements (3, 4) preloaded against a shoulder (20) on the stem (2). The connector is provided with a compensating unit (22) in the form of a piston means (23, 24) placed between the looking nut (21) and an adjacent ring element (13) on the stem (2), and which is arranged to be activated by a hydraulic pressure fluid, so that a preload on the ring elements (3, 4) and the bearings (11) is maintained during operation of the connector, and changes of the extrusion openings in the sealing zones are reduced to a minimum.

18 Claims, 2 Drawing Sheets

ROTATING CONNECTOR WITH COMPENSATING UNIT

Figure 1:
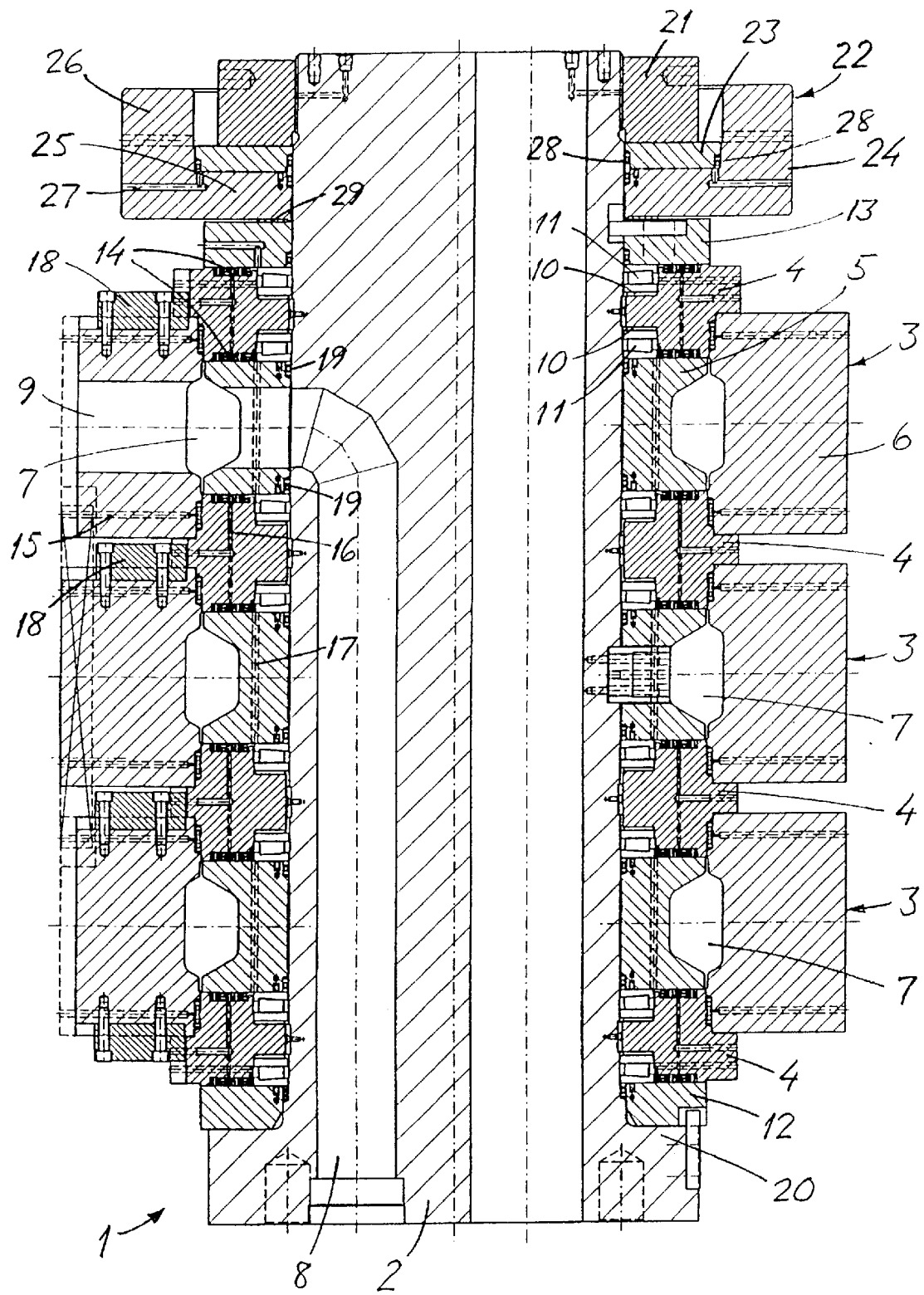

The invention relates to a rotating connector for the transfer of at least one pressurized processed fluid, and comprising a central stem on which there is placed a number of ring elements comprising at least one annulus element for fluid transfer between an associated course in the stem and an outlet from the connector, and a bearing ring element arranged on each side of the annulus element, which bearing ring element is provided with bearings for abutment against adjacent ring elements and is sealed against the ring elements by dynamic seals operated by a barrier liquid having a higher pressure than the process fluid pressure, and a locking nut to keep the ring elements preloaded against a holding member on the stem.

A rotating connector or swivel of the above-mentioned type is particularly used within the offshore industry, for the transfer of process fluids and injection of gas and water in connection with recovery and processing of oil and gas. In such a connector a number of ring elements, with bearings and seals, normally will be placed above each other on the central stem. The locking nut arranged at the top of the stem keeps all the rings prestressed or preloaded against a shoulder on the stem. During the assembly of the connector or swivel, the ring elements are preloaded against the shoulder by means of the locking nut and a preloading tool.

The dynamic seals of the connector during operation are activated by a hydraulic barrier liquid having a pressure which is always higher than the process fluid pressure in the individual dual main courses in the swivel. In this manner process liquid is prevented from leaking across the seals, at the same time as the seals are activated by a clean hydraulic oil, so that the seals operate under very favourable conditions.

However, when barrier liquid pressure is applied, the stem will stretch and the locking nut will be twisted because of the operating piston forces. This will also be able to entail that the roller bearings lose their preload. These circumstances will result in an undesirable increase of the extrusion openings for the individual dynamic seals, and the bearing ring elements are also given a greater possibility for deformation under varying operational conditions. It is obviously desirable to avoid that this stem extension and/or deformations of the rings assert themselves in the sealing zone.

The object of the invention therefore is to provide a means which maintains the preload on the roller bearings and thereby reduces the possibility of the bearing ring elements for deformation, and which further eliminates/restricts changes in the extrusion openings for the dynamic seals, so that the operational conditions for these critical seals are substantially improved.

The above-mentioned object is achieved with a rotating connector of the introductorily stated type which, according to the invention, is characterized in that it is provided with a compensating unit in the form of a piston means placed between the locking nut and an adjacent ring element on the stem, and which is arranged to be activated by a hydraulic pressure fluid, so that a preload on the ring elements and the bearings is maintained during operation of the connector.

Figure 2:
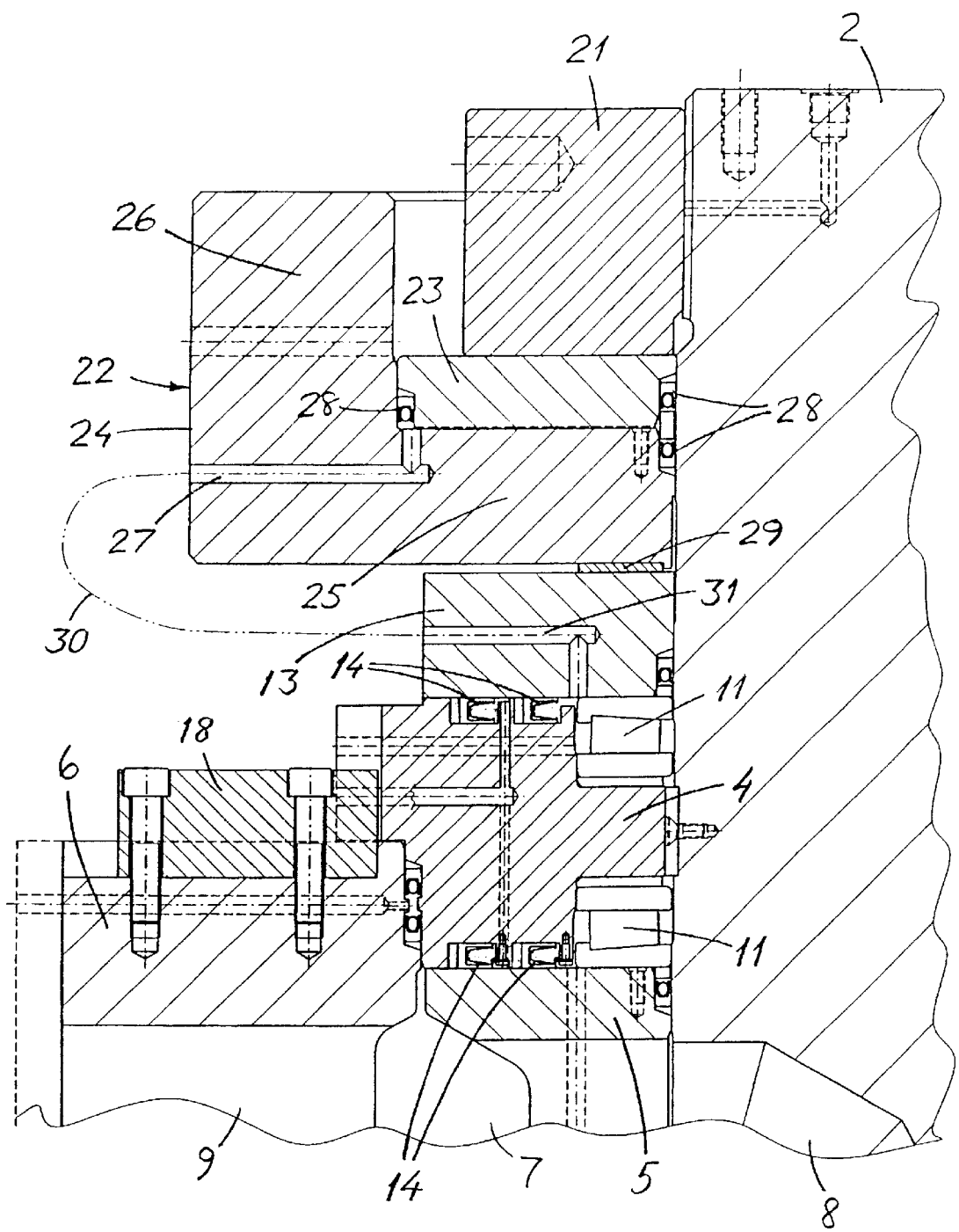

The invention will be further described below in connection with an exemplary embodiment with reference to the drawings, wherein FIG. 1 shows a longitudinal sectional view of a rotating connector which is provided with a compensating unit according to the invention; and FIG. 2 shows a section of the compensating unit in FIG. 1 on an enlarged scale.

The rotating connector or swivel 1 shown in FIG. 1 comprises a central core or stem 2 on which there is placed a number of ring elements, in the illustrated case more specifically three annulus elements 3 and four bearing ring elements 4 arranged on respective sides of the annulus elements, so that a bearing ring element 4 is arranged on each side of each of the annulus elements 3. Each annulus element 3 comprises an intermediate mediate ring 5 and an outlet ring 6 defining an annulus 7 between them, each annulus 7 providing for a fluid-transferring connection between an associated axially extending course 8 (only one is shown) in the stem 2 and an outlet 9 in the outlet ring 6, when the intermediate rings and the outlet rings possibly rotates in relation to each other during operation of the swivel.

As shown, each bearing ring element 4 on each side is provided with a ring groove 10 receiving a roller bearing 11 resting against an adjacent ring element, more specifically against the intermediate rings 5, except for the roller bearing located lowermost in the ring element stack and resting against a lower end ring 12, and the uppermost located roller bearing resting against an upper end ring 13.

The bearing ring elements 4 are sealed against the adjacent ring elements, i.e. the intermediate rings 5 and the end rings 12, 13, by means of dynamic seals in the form of double lip seals 14 which are operated or activated by a barrier liquid having a higher pressure than the pressure of the process fluid or process fluids transferred via the courses 8 and the annuluses 7. The barrier liquid —preferably hydraulic oil —is supplied via channels 15, 16, 17 arranged partly in the outlet rings 6 and partly in the bearing ring elements 4, and also in the intermediate rings 5, so that the channels form connections between a non-illustrated pressure source for barrier liquid and the dynamic seals which are to be activated/lubricated, and also between said source and other details which are to be lubricated.

Each bearing ring 4 is fixed in relation to an associated outlet ring 6 by means of a wedge 18, so that these rings perform the same relative movement in relation to the intermediate rings 5 and the end rings 12, 13. The latter rings are stationarily arranged on the stem 2, and the intermediate rings 5 are provided with static seals 19 for sealing against the process fluid in the associated courses 8.

The different ring elements 4, 5, 12, 13 and the associated roller bearings 11 in the swivel device are kept preloaded against an abutment shoulder 20 on the stem 2 by means of a locking nut 21 which is threaded onto the top of the stem and may be tightened by means of a tightening tool. Thereby a suitable, initial prestressing or preload of the ring elements and the roller bearings can be set, for achieving the best possible operational conditions for the dynamic seals.

As mentioned in the introduction, the stem will stretch somewhat and the locking nut will have a tendency to be twisted when the barrier liquid pressure is applied to the swivel device. In order to avoid the introductorily mentioned, negative effects of these circumstances, a compensating unit 22 is arranged between the locking nut 21 and the end ring 13, which compensating unit maintains the initial preload on the ring elements and the roller bearings during operation of the connector or swivel device. This compensating unit consists of a piston means which is arranged to be activated by a hydraulic pressure fluid.

As a result of the fact that the initial preload is maintained both during start-up and during the different operating modes, one achieves that variations in extrusion opening and axial dynamic movement of the dynamic seals are restricted dramatically.

In the illustrated embodiment the compensating unit comprises an annular compensator piston 23 which surrounds the stem 2 and is axially displaceably arranged in a compensator housing 24. The piston ring 23 rests against the locking nut 21, and the compensator housing 24 comprises a bottom part 25 located between the piston ring 23 and the end ring 13, and an outer wall member 26 extending axially in the direction towards the locking nut 21. The space between the piston ring 23 and the bottom part 25 of the compensator housing is connected to a pressure port 27 for the supply of the hydraulic pressure fluid for activation of the piston means. Seals 28 are arranged between the piston ring 23 and the compensator housing 24, and between the compensator housing and the stem 2. When hydraulic pressure fluid is supplied via the pressure port 29, the compensator housing 24 will be pressed in the direction towards the end ring 13, so that said extension of the stem 2 and the deformation of the locking nut 24 are compensated for.

As will be appreciated, the piston ring 23 in the illustrated embodiment is stationary, whereas the compensator housing 24 is moved away from the piston when the compensating unit is activated. However, one can also conceive of an alternative embodiment wherein the compensator housing is inverted and rests stationarily with its bottom part against the locking nut, so that the piston ring is moved away from the bottom part when the compensating unit is activated.

The active piston surface of the compensating unit is adapted in such a manner that there is obtained an optimal force balance internally in the swivel device in relation to the actual pressure at which the compensating unit is operated. An optimal pressure balance across the swivel device is characterized in that the initial extrusion opening and variations in the extrusion opening in the different operating modes are within very narrow tolerances.

The compensator housing 24 is designed in such a manner that, during operation, one avoids large deformations which may involve unfavourable force transfer to the end ring 13. For this purpose the outer wall member 26 of the compensator housing has a substantial thickness for the provision of a large moment of resistance, to prevent deflection of the compensator housing under the influence of the hydraulic pressure fluid.

Further, in order to ensure a deformation-free transfer of the axial force from the compensating unit to the ring elements and the roller bearings, a relatively thin pressure washer 29 is placed between the compensating unit 22 and the end ring 13. The pressure washer has a substantially smaller outer diameter than the end ring, and generally is specified such that the force from the compensating unit is transferred directly to the roller bearings and does not involve a deflection of the end ring 13 against the upper bearing ring 4.

As regards the supply of pressure fluid to the compensating unit, this may be connected to a separate pressure source (not shown) for the supply of hydraulic pressure fluid for activation of the unit. Alternatively, the pressure fluid for activation of the compensating unit may be supplied from the same pressure source as the source for supply of barrier liquid for activation of the dynamic seals 14. This may give a simpler integration of the compensating unit in the swivel device. Such an embodiment is suggested in FIG. 2 wherein a stippled line 30 illustrates an interconnection between the pressure port 27 and a channel 31 arranged in the end ring 13 and communicating with the channel system 15, 16, 17 for the supply of barrier liquid to, inter alia, the dynamic seals 14.

The compensating unit may be activated at the same time as or after that the barrier liquid pressure to the swivel device is applied.

What is claimed is:

1. A rotating connector for the transfer of at least one pressurized process fluid, and comprising a central stem (2) on which there is placed a number of ring elements (3, 4) comprising at least one annulus element 63) for fluid transfer between an associated course (8) in the stem (2) and an outlet (9) from the connector, and a bearing ring element (4) arranged on each side of the annulus element (3), which bearing ring element is provided with bearings (11) for abutment against adjacent ring elements and is sealed against the rig elements by dynamic seals (14) operated by a barrier liquid having a higher pressure than the process fluid pressure, and a locking nut to keep the ring elements (3, 4) preloaded against, a holding member (20) on the stem (2), CHARACTERIZED IN that said rotating connector provided with a compensating unit (22) in the form of a piston means (23, 24) placed between the locking nut, (21) and an adjacent ring element (13) on the stem (2), and which is arranged to be activated by a hydraulic pressure fluid, so that a preload on the ring elements (3, 4) and the bearings (11) is maintained during operation of the connector.

2. A rotating connector according to claim 1, CHARACTERIZED IN that the compensating unit (22) comprises an annular compensator piston (23) which surrounds the stem (2) and is axially displaceably arranged in a compensator housing (24), the piston ring (23) resting against the locking nut (21) and the compensator housing (24) comprising a bottom part (25) located between the piston ring (23) and the adjacent ring element (13), and an outer wall member (26) extending in the direction towards the locking nut (21).

3. A rotating connector according to claim 2, CHARACTERIZED IN that the outer wall member (26) has a substantial thickness to provide a large moment of resistance, to prevent deflection of the compensator housing (24) under the influence of the hydraulic pressure fluid.

4. A rotating connector according to claim 1, CHARACTERIZED IN that an end ring (13) is placed between the compensating unit (22) and the associated bearing ring element (4), and that an annular pressure washer (29) having a substantially smaller outer diameter than the end ring (13) is placed between the compensating unit (22) and the end ring.

5. A rotating connector according to claim 1, CHARACTERIZED IN that the compensating unit (22) is connected to a separate pressure source for supply of the hydraulic pressure fluid for activation of the compensating unit (22).

6. A rotating connector according to claim 1, CHARACTERIZED IN that the hydraulic pressure fluid for activation of the compensating unit (22) is provided from the same pressure source as the source for supply of barrier liquid for activation of the dynamic seals (14).

7. A rotating connector according to claim 2, CHARACTERIZED IN that an end ring (13) is placed between the compensating unit (22) and the associated bearing ring element (4), and that an annular pressure washer (29) having a substantially smaller outer diameter than the end ring (13) is placed between the compensating unit (22) and the end ring.

8. A rotating connector according to claim 3, CHARACTERIZED IN that an end ring (13) is placed between the compensating unit (22) and the associated bearing ring element (4), and that an annular pressure washer (29) having a substantially smaller outer diameter than the end ring (13) is placed between the compensating unit (22) and the end ring.

9. A rotating connector according to claim 2, CHARACTERIZED IN that the compensating unit (22) is connected to a separate pressure source for supply of the hydraulic pressure fluid for activation of the compensating unit (22).

10. A rotating connector according to claim 3, CHARACTERIZED IN that the compensating unit (22) is connected to a separate pressure source for supply of the hydraulic pressure fluid for activation of the compensating unit (22).

11. A rotating connector according to claim 4, CHARACTERIZED IN that the compensating unit (22) is connected to a separate pressure source for supply of the hydraulic pressure fluid for activation of the compensating unit (22).

12. A rotating connector according to claim 7, CHARACTERIZED IN that the compensating unit (22) is connected to a separate pressure source for supply of the hydraulic pressure fluid for activation of the compensating unit (22).

13. A rotating connector according to claim 8, CHARACTERIZED IN that the compensating unit (22) is connected to a separate pressure source for supply of the hydraulic pressure fluid for activation of the compensating unit (22).

14. A rotating connector according to claim 2, CHARACTERIZED IN that the hydraulic pressure fluid for activation of the compensating unit (22) is provided from the same pressure source as the source for supply of barrier liquid for activation of the dynamic seals (14).

15. A rotating connector according to claim 3, CHARACTERIZED IN that the hydraulic pressure fluid for activation of the compensating unit (22) is provided from the same pressure source as the source for supply of barrier liquid for activation of the dynamic seals (14).

16. A rotating connector according to claim 4, CHARACTERIZED IN that the hydraulic pressure fluid for activation of the compensating unit (22) is provided from the same pressure source as the source for supply of barrier liquid for activation of the dynamic seals (14).

17. A rotating connector according to claim 7, CHARACTERIZED IN that the hydraulic pressure fluid for activation of the compensating unit (22) is provided from the same pressure source as the source for supply of barrier liquid for activation of the dynamic seals (14).

18. A rotating connector according to claim 8, CHARACTERIZED IN that the hydraulic pressure fluid for activation of the compensating unit (22) is provided from the same pressure source as the source for supply of barrier liquid for activation of the dynamic seals (14).

* * * * *